Oct. 17, 1967 — G. A. PRICE — 3,347,149
COFFEE BREWING APPARATUS
Filed Oct. 22, 1965
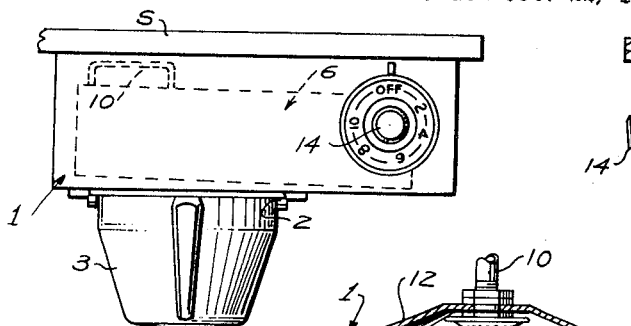
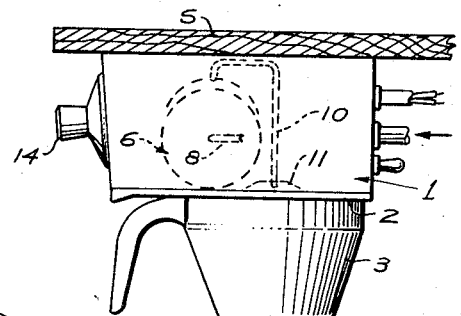
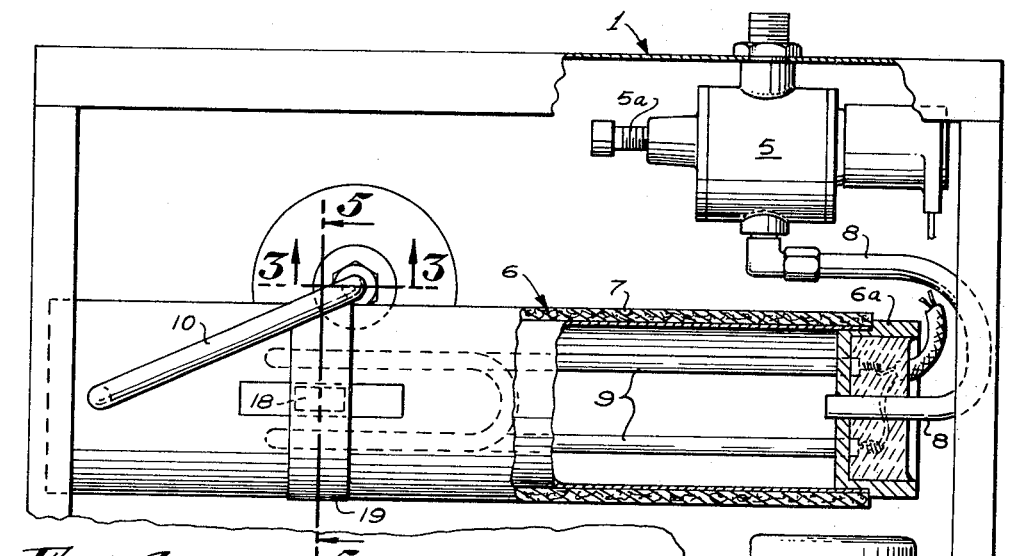
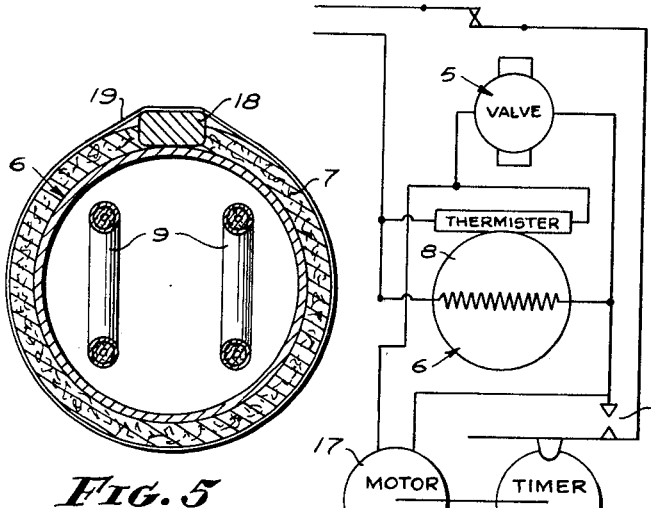
GAIL A. PRICE
INVENTOR.
BY Lyon & Lyon
ATTORNEYS

United States Patent Office 3,347,149
Patented Oct. 17, 1967

3,347,149
COFFEE BREWING APPARATUS
Gail A. Price, Inglewood, Calif., assignor to Farmer Bros. Co., Torrance, Calif., a corporation of California
Filed Oct. 22, 1965, Ser. No. 501,268
4 Claims. (Cl. 99—282)

ABSTRACT OF THE DISCLOSURE

A coffee brewer having a heater dimensioned to fit under a shelf for discharge of hot water and an underlying removable brewing vessel; the heater including a horizontal tank in heat transfer relation with a temperature sensor and containing a heating element, the sensor causing the supply valve to open for discharge of water into the brewing vessel and also initiating operation of a timer to shut off flow after a predetermined interval.

---

This invention relates to coffee brewing apparatus, and included in the objects of this invention are:

First, to provide an apparatus adapted for brewing of coffee by the filter method and which is particularly adapted for household use, the brewer being so arranged that it may be mounted under a kitchen cabinet shelf over a counter.

Second, to provide a coffee brewing apparatus which utilizes an electric water heater permanently connected to a water supply line through a valve and which employs a novel means for controlling the volume of water passing through the heater so that a few or a substantial number of cups of coffee may be brewed.

Third, to provide a coffee brewing apparatus which incorporates a control which delays flow of water until an initial supply contained in the heater tank has been elevated to the proper temperature; the control being arranged in intimate contact with the heater tank to reflect actual water temperature, so that the water does not flow until the water has reached a predetermined temperature, and whereby if several brews are made in quick succession, the temperature at which the control functions to cause flow of water does not rise but remains constant.

Fourth, to provide a coffee brewing apparatus wherein the discharge temperature may be maintained close to the boiling point of the water without danger of exceeding the boiling point and causing the generation of steam in the heater tank.

With the above and other objects in view as may appear hereinafter, reference is directed to the accompanying drawings, in which:

FIGURE 1 is a front view of the coffee brewing apparatus.

FIGURE 2 is an end view thereof.

FIGURE 3 is an enlarged fragmentary sectional view taken directly through 3—3 of FIGURE 4, showing the discharge end of the water supply line.

FIGURE 4 is an enlarged fragmentary plan view with the cover removed showing the principal components with portions shown in section.

FIGURE 5 is an enlarged transverse sectional view of the water tank taken through 5—5 of FIGURE 4.

FIGURE 6 is a simplified diagram showing the electrical relationship of the components.

Specification

The coffee brewer includes a rectangular housing 1 which is adapted to be secured by any suitable means under a shelf S. The underside of the housing is provided with a pair of guides 2 which receive the rim of a coffee brewing container 3 so that the brewing container may be fitted under and retained by the housing 1.

The container is conventional and is of the type arranged to receive a filter paper on which the coffee grounds are deposited. At its lower extremity, the container has a small discharge spout 4.

Mounted within the housing 1 is a shut-off and regulator valve 5 which may be of the type more fully disclosed in the copending application of Harry M. Umann, Ser. No. 341,794, filed Jan. 31, 1964, now Patent No. 3,308,-847, for Solenoid Operated Shut Off and Regulator Valve.

Also mounted in the housing 1 is a heater tank 6 provided with covering of insulation 7. The tank is elongated and relatively small in diameter so that its volume is commensurate with the volume of water required for the minimum brew for which the brewer is designed, for example, about two cups. The tank is disposed in an essentially horizontal position with one end slightly lower than the other. The lower end receives an end fitting 6a.

An inlet line 8 extends from the valve 5 to the fitting 6a and is centrally positioned so as to discharge axially into the tank.

An electric emersion heater 9 is contained in the tank. The heater is in the form of a rod comprising a sheath of metal encasing a heating element and insulation material. The rod is folded intermediate its ends to form a U-shape; then is again folded so that it is essentially J-shaped in side aspect. The ends of the rod are contiguous and extend into the fitting 6a. In the double-folded region of the heater 9, four lengths of rod are disposed equal distant from the axis of the tank as shown in FIGURE 5. Two lengths of rod extend between the double-folded region and the inlet end of the tank. Thus, the heater forms a section near the discharge end of the tank of increased heat transfer provided by the four lengths of rod.

A tank outlet line 10 extends upwardly from the opposite or higher end of the tank 6 and then downwardly terminating in a spray nozzle 11, so located as to be approximately centered over the brewing container 3 when the brewing container is in place. The spray nozzle is preferably set in a recess 12 to clear the container.

Mounted on the front side of the housing 1 is a timer 13, having a manually engageable control knob 14. The timer includes a cam 15 which controls a cam switch 16. The timer is turned manually in one direction and is returned to its original position by means of a motor 17.

Mounted on the top of heater tank 6 is a thermistor 18 which is set into the insulation so that the thermistor is in intimate contact with the wall of the tank. The thermistor 18 is held in place by a retaining band 19. The thermistor is located near the discharge end of the heater tank and above the region having four lengths of the heater rods.

As indicated in the wiring diagram, the cam switch 16 controls the motor 17, the resistance element 8 and the inlet valve 5; however, the return lead from the valve 5 and the motor 17 passes through the thermistor. The thermistor has, at ambient temperatures, a relatively high resistance. As its temperature is raised, its resistance decreases until it passes sufficient current to operate the solenoid valve 5 and the motor 17.

Operation of the coffee brewing apparatus is as follows:

A filter and a charge of coffee are placed in the coffee container and the container is placed under the housing so as to occupy the position shown in FIGURES 1 and 2. The cam 15 is turned manually to select the duration that the inlet valve 5 is to remain open, thereby selecting the number of cups of coffee to be brewed.

Initially, the tank contains a small charge of water previously supplied thereto from the valve 5. When the timer is turned, the circuit through the heater 9 is closed, causing the heater to heat the water in the tank 6. The valve 5 and the motor 17 remain inoperative until sufficient heat from the water is conducted through the walls of the tank to cause the thermistor to pass sufficient current to open the valve 5 and start the motor 17. When the valve opens, cold water enters the tank, drawing the heated water out the line 10. The incoming water is heated so that hot water flows continuously for the period delivered by the setting of the timer. Thus, two to ten cups or so of water may be discharged, as desired. When the motor has turned the cam back to its starting position, the valve 5 closes, the motor stops, and the resistance element is inactivated.

It will be noted that the thermistor is in intimate heat-conductive relation to the water tank, so that it is the temperature of the water in the tank which determines the temperature of the thermistor rather than the internal resistance of the thermistor. Stated otherwise, while the thermistor by reason of its internal resistance tends to heat and thus act as a time-delay switch, internal heating of the thermistor is render ineffective due to the ability of the walls of the tank and the water to dissipate the heat generated by such internal resistance. The thermistor behaves as if it had no tendency to heat from internal resistance. The ability of the thermistor to reflect only the water temperature is of substantial importance, for, quite often, it is desired to brew several batches of coffee in quick succession before the temperature of the water in the storage tank returns to ambient temperature. With the arrangement herein disclosed, a heating cycle of approximately two minutes is sufficient to bring the water in the tank to temperature. If the water in the tank is already hot from a previous brew, the length of time to bring the water up to temperature may be less than a minute; however, in each case, the brewing time is the same, as the motor 17 starts the timing cycle only after the water is at the proper temperature.

It should be noted that the thermistor may be predesigned to pass the required current at any selected temperature, and by reason of the intimate association of the thermistor and the tank the water temperature may be close to the boiling point but need not exceed the boiling point, such as between 195° and 110° F.

It should be noted that the incoming water tends to move as a horizontal column through the tank with minimal intermixing with the heated water, so that the temperature of the discharging water is not appreciably affected. Also, the incoming water flows through the region having four rod sections, so that the incoming water is fully heated and maintains the thermistor at its operating temperature.

The solenoid valve 5 includes a pressure regulator controlled by a screw 5a. By adjusting the pressure regulator, the pressure of the water in the tank, which is any case is low, may be adjusted. As the flow rate is a function of the pressure, the volume of water for a given time setting may be preadjusted.

While a particular embodiment of this invention has been shown and described, it is not intended to limit the same to the details of the construction set forth, but, instead, the invention embraces such changes, modifications, and equivalents of the various parts and their relationships as come within the purview of the appended claims.

I claim:

1. A coffee brewing apparatus, comprising:
    (a) a flat, essentially rectangular housing adapted for installation under a shelf or the like and having a front side and a back side;
    (b) a brewing container slidable under said housing;
    (c) a solenoid inlet valve in said housing at the back side thereof;
    (d) a flow line communicating between said valve and a discharge point disposed above said container;
    (e) a horizontal heater tank extending substantially the width of said housing and occupying substantially the vertical depth of said housing, said heater tank interposed in said flow line and having a heating element therein;
    (f) a timer at the front of said housing for said heating element and valve;
    (g) and means sensitive to the temperature in said tank for energizing said solenoid valve and timer when the temperature of water in said tank reaches a predetermined value, thereby to cause flow of hot water into said brewing container until terminated by said timer.

2. A coffee brewing apparatus, comprising:
    (a) a housing adapted for installation under a shelf or the like;
    (b) a brewing container slidable under said housing;
    (c) a solenoid inlet valve in said housing;
    (d) a flow line communicating between said valve and a discharge point disposed above said container;
    (e) a heater tank interposed in said flow line and having a heating element therein;
    (f) a manually settable timer for said heating element and valve;
    (g) and a thermistor disposed in intimate heat transfer relation with said tank to open said valve and actuate said timer when the temperature of water in said tank reaches a predetermined value.

3. An apparatus for supplying water to a coffee brewing container, comprising:
    (a) a solenoid valve;
    (b) a flow line from said valve to a point of discharge into said container;
    (c) a heater tank interposed in said flow line, the discharge from said tank being from the upper side thereof, whereby said tank holds a charge of water which has previously passed said valve;
    (d) a heating element in said tank;
    (e) a manually settable timer including a timing motor and a switch, the switch being connected with said timing motor, heating element and valve;
    (f) and a temperature sensitive means disposed in heat conductive relation with said tank and electrically connected with said timing motor and solenoid valve to initiate operation of said timing motor and to open said valve, when the water in said tank has been heated to a predetermined value, to discharge said water therefrom and cause the flow of additional water into and through said tank while being heated by said heating element.

4. An apparatus for supplying water to a coffee brewing container, comprising:
    (a) an elongated tank disposed essentially longitudinally and including an axially directed inlet at one end, and an outlet at its upper side adjacent its other end;
    (b) an emersion heater in said tank extending from said inlet toward outlet and including a section arranged for increased heat transfer to surrounding water at its extended portion;

(c) a thermistor disposed opposite said section in intimate heat conductive relation with said tank whereby said thermistor reflects the temperature of said tank and its contents irrespective of the heating effect of the internal resistance of said thermistor;

(d) a solenoid valve for supplying water to said tank;

(e) a timer for closing said valve and terminating operation of said heater;

(f) said thermistor electrically connected to said valve and timer for opening said valve and initiating a timing cycle determined by said timer.

References Cited
UNITED STATES PATENTS

| | | | |
|---|---|---|---|
| 3,036,512 | 5/1962 | Tarrant et al. | 99—305 |
| 3,100,434 | 8/1963 | Bunn | 99—282 |

ROBERT W. JENKINS, *Primary Examiner.*